United States Patent [19]
Yokota et al.

[11] Patent Number: 5,592,660
[45] Date of Patent: Jan. 7, 1997

[54] DATABASE MANAGEMENT SYSTEM TO ALTERNATELY PERFORM RETRIEVAL PROCESS AND UPDATING PROCESS

[75] Inventors: Haruo Yokota, Tatsunokuchimachi; Yasuo Noguchi, Kawasaki; Naoki Akaboshi, Kawasaki; Katsumi Hayashi, Kawasaki; Seigo Hirosue, Kawasaki, all of Japan

[73] Assignee: Fujitsu Limited, Kawasaki, Japan

[21] Appl. No.: 912,525

[22] Filed: Jul. 13, 1992

[30] Foreign Application Priority Data

Mar. 4, 1991 [JP] Japan .................................. 4-046893
Jul. 12, 1991 [JP] Japan .................................. 3-172756

[51] Int. Cl.$^6$ ............................................. G06F 17/30
[52] U.S. Cl. ................... 395/608; 395/182.18; 395/242; 364/225.2; 364/268; 364/271.5; 364/282.1; 364/918.2; 364/DIG. 1
[58] Field of Search ................................ 395/600, 575, 395/425, 400, 700, DIG. 1, 182.18, 182.08, 182.09

[56] References Cited

U.S. PATENT DOCUMENTS

| | | | |
|---|---|---|---|
| 4,657,819 | 3/1987 | Stiffler et al. | 395/425 |
| 4,819,159 | 4/1989 | Shipley et al. | 395/575 |
| 5,051,887 | 9/1991 | Berger et al. | 395/425 |
| 5,060,185 | 10/1991 | Naito et al. | 395/425 |
| 5,123,099 | 6/1992 | Shibata et al. | 395/425 |
| 5,175,849 | 12/1992 | Schneider | 395/600 |
| 5,212,789 | 5/1993 | Rago | 395/600 |
| 5,274,799 | 12/1993 | Brant et al. | 395/575 |
| 5,307,481 | 4/1994 | Shimazaki et al. | 395/575 |
| 5,317,731 | 5/1994 | Dias et al. | 395/600 |

OTHER PUBLICATIONS

Lyon, Jim, "Tandem's Remote Data Facility", Compcon Spring 1990; Thirty-Fifth IEEE Computer Society Internal Conference. Digest of Papers, IEEE, 1990, pp. 526–527.

Primary Examiner—Thomas G. Black
Assistant Examiner—Hosain T. Alam
Attorney, Agent, or Firm—Staas & Halsey

[57] ABSTRACT

A database system including a transaction database system processing device for executing a transaction database process and a decision support database system processing device for executing a decision support process. The database system further includes a transaction database storage device, provided with the transaction database device, for retaining a transaction database created and updated by the transaction database process, a first and second database storage device, each provided with the decision support database device, and each for retaining a first and a second decision database, respectively, for use in a decision support process, a delayed updating device, provided with the decision support database device, for receiving a log created based on the transaction database at each of a predetermined time interval, and for alternatively supplying both the log received at a current predetermined time interval and the log received immediately preceding the current predetermined time interval to the first database storage device and to the second database storage device at each predetermined time interval, and a retrieving device, provided with decision support database device, for executing a retrieving process for the second decision database stored in the second database storage device when the delayed updating device supplies both logs to the first database storage device and for executing a retrieving process for the first decision database stored in the first database storage device when the delayed updating device supplies both logs to the second database storage device.

14 Claims, 14 Drawing Sheets

DATABASE MANAGEMENT SYSTEM TO ALTERNATELY PERFORM RETRIEVAL PROCESS AND UPDATING PROCESS

BACKGROUND OF THE INVENTION

1. Field of the Invention

This invention pertains to a database system capable of performing more than two [2] kinds of processes simultaneously, such as a hit-transaction database system process and a decision support database system process. More particularly, it pertains to a database system having area for a hit-transaction database system process separate from an area for a decision support database system process, as well as a function for delayed updations of the content in these areas and a function of executing retrieval jobs in the decision support database system.

2. Description of the Related Arts

A database has roughly two [2] kinds of processes. One is a hit-transaction database system process, such as an OLTP (online transaction processing), for simultaneously handling a large number of jobs having relatively lighter workloads with an emphasis on spontaneity. The other is a decision support database system process, e.g. a decision making support by statistically treating data collected by the hit-transaction database system process, having extremely heavy workloads.

If we seek an example in banking, the hit-transaction database system process includes a database access job for dispensing cash to a customer, and the decision support database system process includes a cash flow analysis of a particular financial product.

Conventionally, the hit-transaction database system process is working during a period for an OLTP, while the decision support database system process is ordinarily executed during nighttimes after an OLTP. This is because a decision support database system process may invoke an exclusive control that inhibits an execution of a bulk of the jobs of the hit-transaction database system process, which damages the spontaneity of the hit-transaction database system process.

As such, response time of retrieving data from the decision support database system process has been forgone more or less. Yet, a necessity for a more responsive strategic information system (SIS) have aroused a growing demand of a decision support database system process allowing more contemporary data to be extracted during a period for an OLTP.

When a hit-transaction database system process is working simultaneously with a decision support database system process, while their areas remain separate, a equivalence between the contents of their data areas is maintained as close as possible. A technique is used for this purpose whereby a database updation log generated in the hit-transaction database system process is applied to the data area of the decision support database system process after a predetermined interval.

The following description assumes that an area A refers to the data area of a hit-transaction database system process including a process A, and that an area B refers to the data area of a decision support database system process including a process B. Conventionally, a log obtained as an updated content of area A in the hit-transaction database system process is applied to area B for its delayed updation after a predetermined interval. Process B then uses data, which have updated area A and been copied to area B by its delayed updation.

FIG. 1 is a block diagram of a conventional database system, showing a flow in steps of maintaining a equivalence between data areas.

ST1: A log's secondary storage device temporarily saves a log content in area A pertaining to a database generated by process A.

ST2: At every certain time interval, process B receives the log content read from the log's secondary storage device.

ST3: A delayed updation updates area B.

ST4: Data in area B undergoes process B.

FIG. 2 is a timing chart showing a sequence of delayed updations and retrieval jobs, in relation to logs, executed by the conventional database system shown in FIG. 1.

A method is to allocate to process B (the decision support database system process) the time difference between the time interval allowed for process A (in the hit-transaction database system process) and the time necessary for a delayed updation.

However, this method has such a problem that the less a time interval can be allocated to process A (the basic system process) for reducing the delay caused by a delayed updation the hit-transaction less a time is allocated to process B.

Besides, there is a problem that a response time of retrieving job in the managerial database system may be extended to a time that allowed for a delayed updation thereby increasing a response time in a whole system.

SUMMARY OF THE INVENTION

This invention aims at enabling a decision support database system process to parallelly perform a delayed updation and a process B (a retrieval job, namely, a searching job).

This invention is premised on a database system comprising a hit-transaction database system process unit for executing a transaction job represented by an OLTP and a decision support database system process unit for executing a retrieval job for a database created by the hit-transaction database system process.

The hit-transaction database system process unit has an area A for storing data created by a hit-transaction database system process.

The hit-transaction database system process unit also has a log area for storing data content created or updated for area A.

The decision support database system process unit has two [2] data storage areas comprised of an area B1 and an area B2.

The decision support database system process unit also has a delayed updating part for updating data in either area B1 or area B2 by a log content read from a log area in the hit-transaction database system process unit, which has been generated after a certain time interval.

The decision support database system process unit finally has a switch controller for switching a data storage area connected with the delayed updating part and a data storage area connected with a retrieval job processing part to be alternately area B1 or area B2.

With the above configuration of this invention, the switch controller controls to connect area B1 with the delayed updating part and area B2 with the retrieval job processing part during a particular time interval. In this case, the delayed updating part updates data in area B1 by applying the log contents stored in the log area of the hit-transaction database system process unit during the first and second preceding time intervals, while the retrieval job processing part executes a retrieval job for data in area B2. During the next time interval, the switch controller controls to reconnect the delayed updating part with area B2 and the retrieval job processing part with area B1. Then, the delayed updating part updates data in area B2 by applying the log contents stored in the log area of the hit-transaction database system process unit during the first and second preceding time intervals, while the retrieval job processing part executes a retrieval job for data in area B1.

As described above, a switching between area B1 and area B2 and a delayed updation of data by a log generated during the first and second time intervals ensure the equivalence of data contents between area B1 and area B2 to be maintained with a delay of a certain time interval.

The above described configuration of this invention enables a delayed updation to be executed parallelly with a retrieval job, which sheds the necessity for a retrieval job to wait for a completion of a delayed updation, thereby allowing a sufficient time to be allocated to a retrieval job.

An adjustment in the time interval allows a retrieval job to take a larger amount of time than contemplated.

In addition to the above configuration, this invention can have a configuration such that the hit-transaction database system process unit further comprises a high speed log application device for storing the data content created or updated for area A similarly to the log area (secondary storage device) and for executing a readout and a write-in at a high speed.

The high speed log application device comprises a semiconductor memory device and expedites a readout and a write-in. It makes the log area to be used exclusively for a write-in, thereby shortening the time required for reading a log content from the log area. In this case, area B1 and area B2 can be replaced by an area B provided singularly in connection with the decision support database system process unit.

The above described configuration of this invention enables a log to be copied to a secondary storage device and a delayed updation to be expedited, because the concurrency of saving a log on a semiconductor memory device and storing it in a secondary storage device sheds the necessity for reading a log from the secondary storage device for a delayed updation. That is, because no time is requited for reading a log from the secondary storage device, a log readout in a delayed updation can be executed at a rate more than ten [10] time faster.

Consequently, this enables a complex decision support database system process to be executed, even though a conventional database system cannot process it concurrently with a hit-transaction database system process.

BRIEF DESCRIPTION OF THE DRAWINGS

One of skill in the art can easily understand additional features and objects of this invention from the description of the preferred embodiments and some of the attached drawings. In the drawings.

DESCRIPTION OF THE PREFERRED EMBODIMENTS

Illustration of an Unerlying Principle

Figure 1:
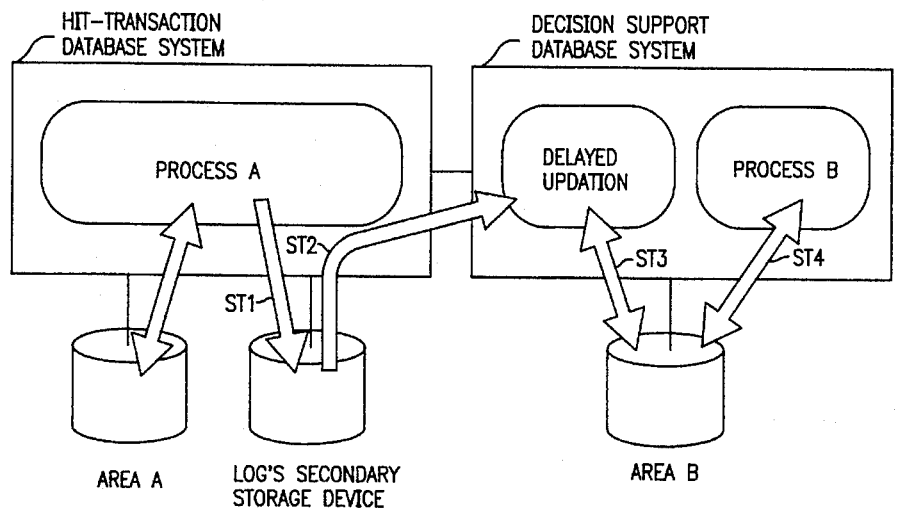
FIG. 1 (PRIOR ART) is a block diagram of a conventional database system, showing a flow in steps of maintaining a equivalence between data area.
Figure 2:
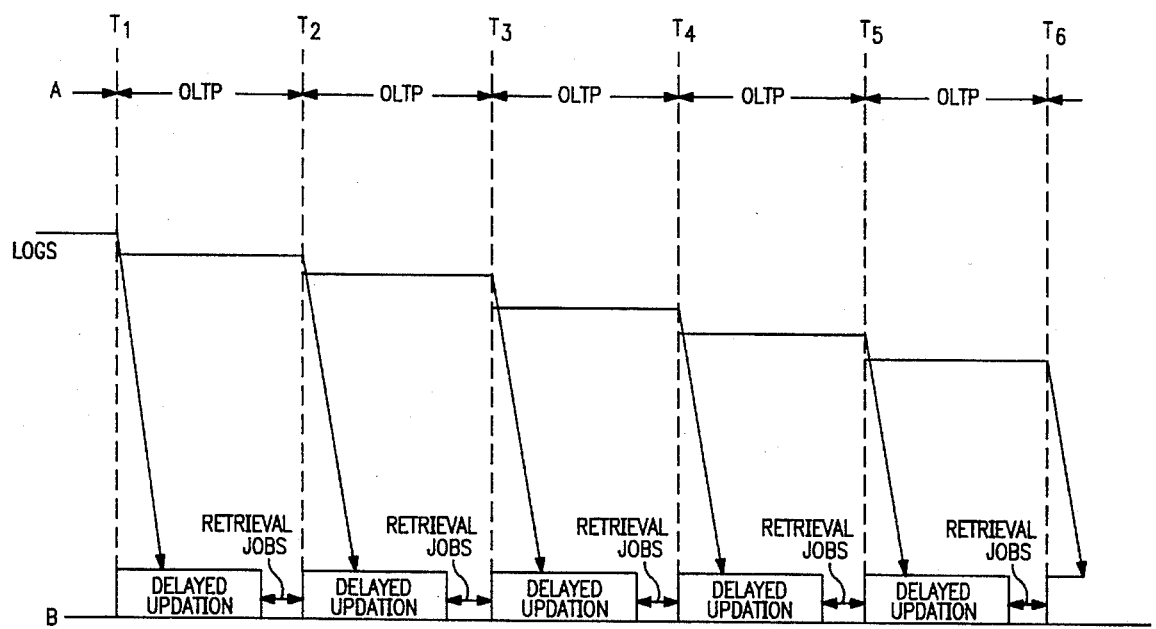
FIG. 2 (PRIOR ART) is a timing chart showing a sequence of delayed updations and retrieval jobs, in relation to logs, executed by the conventional database system shown in FIG. 1.
Figure 3:
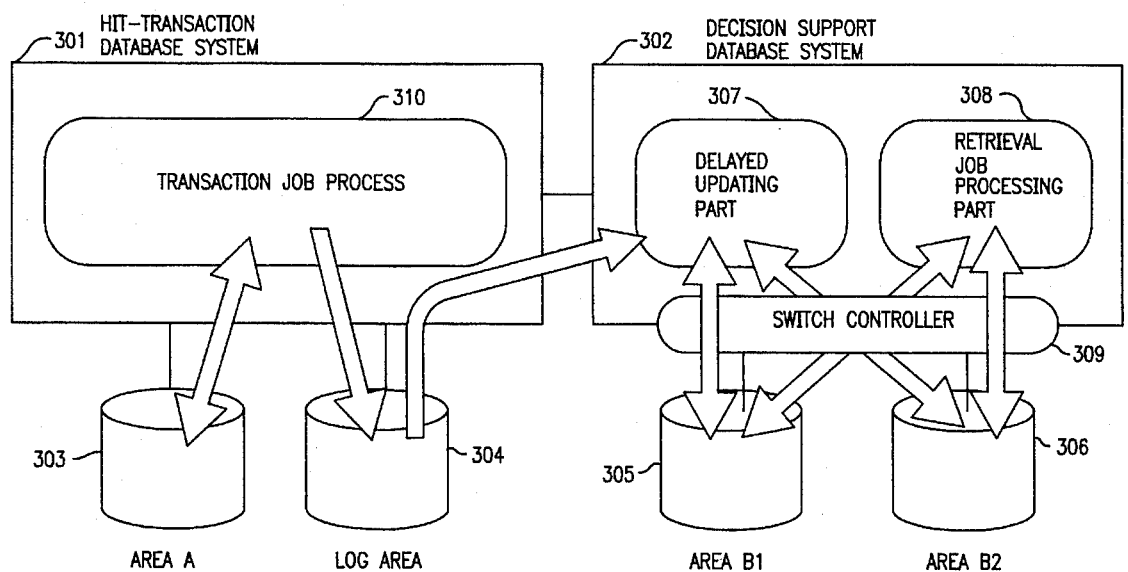
FIG. 3 is a block diagram of a first form of this invention, showing a flow of maintaining a equivalence between data areas.

FIG. 3 is a block diagram of a first form of this invention, showing a flow of maintaining a equivalence between data areas.

The first form of this invention is premised on a database system including a hit-transaction database system process unit 301 for executing a transaction job process 310 and a decision support database system process unit 302 having a retrieval job processing part 308 for executing a retrieval job for a database created by the hit-transaction database system process unit 301.

A transaction job by the hit-transaction database system process unit 301 creates an area A 303, provided in the hit-transaction database system process unit 301, for storing data to be updated, and thus forming a database.

A log area 304 provided in the hit-transaction database system process unit 301 stores a data content updated or created for area A 303.

Two [2] data storage areas provided in the decision support database system process unit 302, namely an area B1 305 and an area B2 306, both store the same database as that in area A 303 in the hit-transaction database system process unit 301.

A delayed updating part 307 provided in the decision support database system process unit 302 reads a log content generated during a certain time interval from the log area 304 in the hit-transaction database system process unit 301 and updates by the log content the data in either of its two [2] data storage areas, i.e. area B1 305 and area B2 306.

A switch controller 309 provided in the decision support database system process unit 302 alternately switches the data storage area connected with the delayed updating part 307 and the data storage area connected with the retrieval job processing part 308 to become either area B1 305 or area B2 306 at every lapse of a certain time interval.

The switch controller 309 controls to connect the delayed updating part 307 with area B1 305 and the retrieval job processing part 308 with area B2 306 during a certain time interval. In this case, the delayed updating part 307 updates the data in area B1 305 by applying the log contents accumulated in the log area 304 in the hit-transaction database system process unit 301 during the first and second preceding time intervals. The retrieval job processing part 308 retrieves data in area B2 306.

During the next time interval, the switch controller 309 controls to connect the delayed updating part 307 with area B2 306 and the retrieval job processing part 308 with area B1 305. Then, the delayed updating part 307 updates the log area 304 in the hit-transaction database system process unit 301 by applying the log contents accumulated during the first and second preceding time intervals.

On the other hand, the retrieval processing part 308 performs a retrieval processing for the data of B1 area 305 which is updated by the delayed updating part 307 in the previous time interval.

As described above, the delayed updation for switching two [2] areas (namely area B1 305 and area B2 306) and updating data by the logs generated by the first and second preceding time intervals for a delayed updation maintains the data content of area B1 305 to be equal to the data content of area B2 306 with a delay of the certain time interval.

Figure 4:
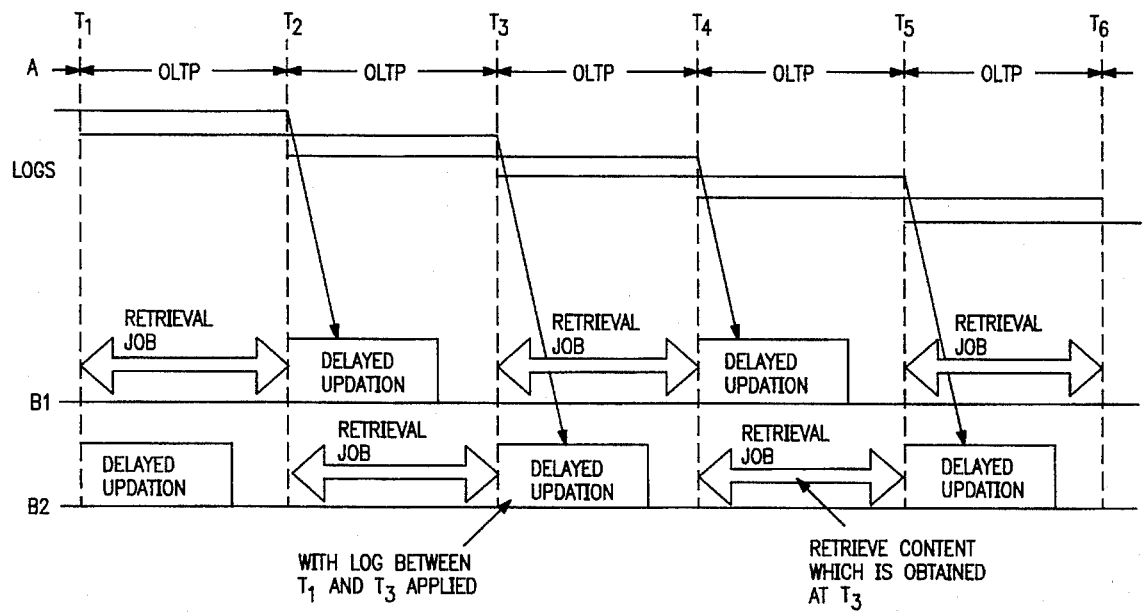
FIG. 4 is a timing chart showing a sequence of delayed updations and retrieval jobs, in relation to logs, executed by the database system shown in FIG. 3.

FIG. 4 is a timing chart showing a sequence of delayed updations and retrieval jobs, in relation to logs, executed by the database system shown in FIG. 3.

The hit-transaction database system process unit 301 executes a transaction process (OLTP) for the database in area A 303 at every lapse of a predetermined time interval $(T_1, T_2, \ldots )$. The time interval $T_i$ ($i=1, 2, \ldots$) means a 1 cycle starting with time $T_i$. Time $T_i-T_{i+1}$ means 1 cycle and time interval $T_i-T_{i+1}$ means 2 cycles. The log area 304 stores a log generated by an OLTP during every lapse of the predetermined time interval.

During the period between $T_3$ and $T_4$ namely, the time interval $T_3$, the delayed updating part 307 in the decision support database system process unit 302 reads from the log area 304 the log generated during the period between $T_1$ and $T_3$, and updates the data in area B2 306, while the retrieval job processing part 308 retrieves data in area B1 305 with regard to the log obtained before $T_2$ and updated during the period $T_2$ and $T_3$.

During the period between $T_4$ and $T_5$, the delayed updating part 307 in the decision support database system process unit 302 reads from the log area 304 the log generated during he period between $T_2$ and $T_4$, and updates the data in area B1 305, while the retrieval job processing part 308 retrieves data in area B2 306, which had already been updated with a delay during the period between $T_3$ and $T_4$.

The above operations cause a log generated during the period between $T_2$ and $T_3$ to be copied to area B1 305 and area B2 306 with an overlap, thereby maintaining the equivalence between the content in area B1 305 and the content in area B2 306 with a delay of one [1] time interval, as well as allowing a delayed updation to be performed concurrently with a retrieval job during the same time interval.

Accordingly, a duplexing of area B sheds the necessity for a retrieval job to wait for a completion of a delayed updation, which ensures a sufficient time to be allocated to a retrieval job. In doing so, it is only sufficient to set a time interval such that a delayed updation is completed in a smaller amount of time than the time required by a hit-transaction database system process, and the difference between the time required by a delayed updation and that required by a hit-transaction database system process need not be considered as in a case in which area B is not duplexed.

Also, as is apparent from FIG. 4, a retrieval job can be executed at anytime. Since a response time does not include a time required for a delayed updation, it is equivalent only to the time required for the innate decision support database system process. Also, an adjustment of a time interval allows a case in which a retrieval job requires a large amount of time.

Figure 5A:
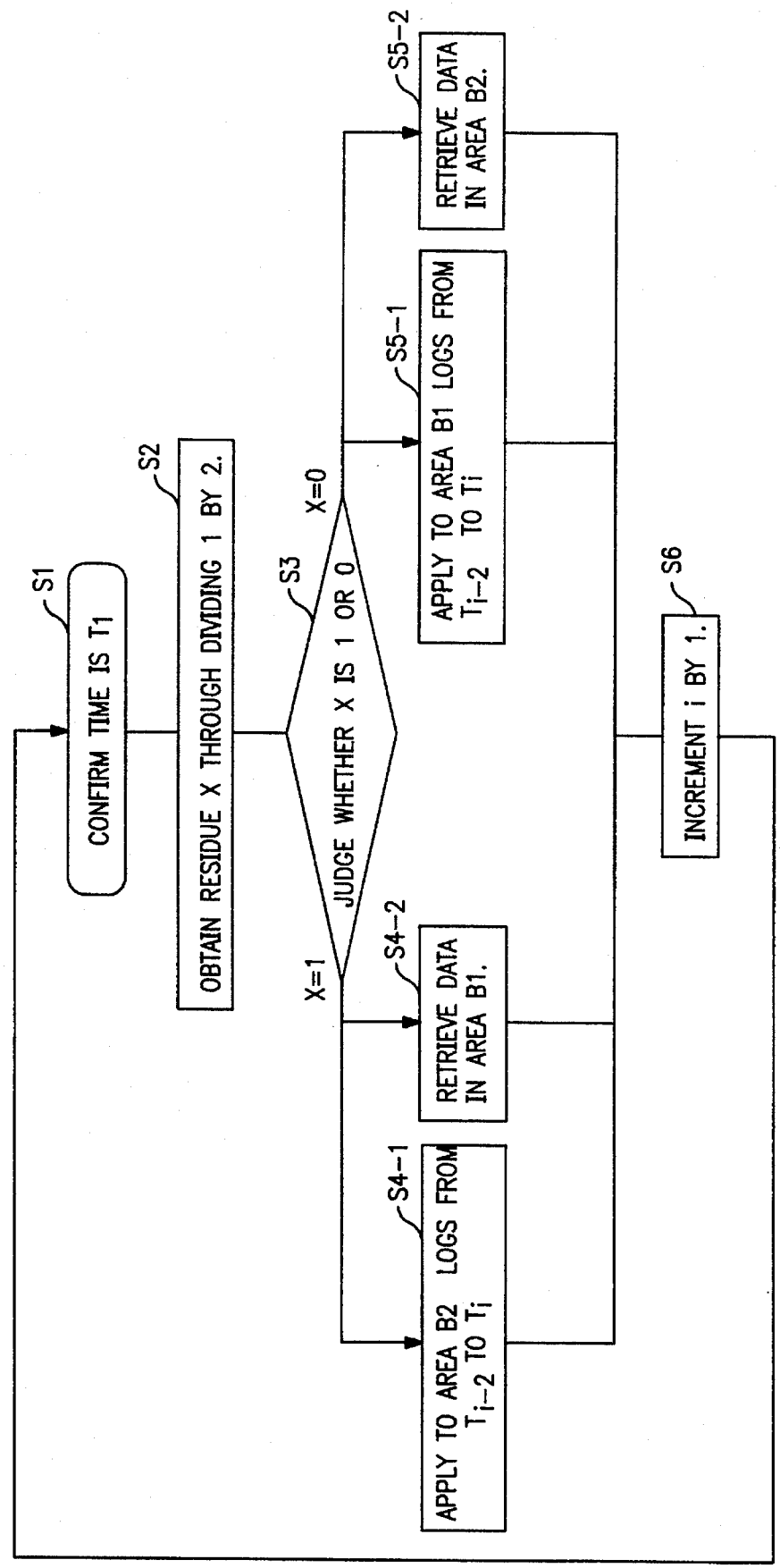
FIG. 5A is a flowchart showing overall operations of this invention.
Figure 5B:
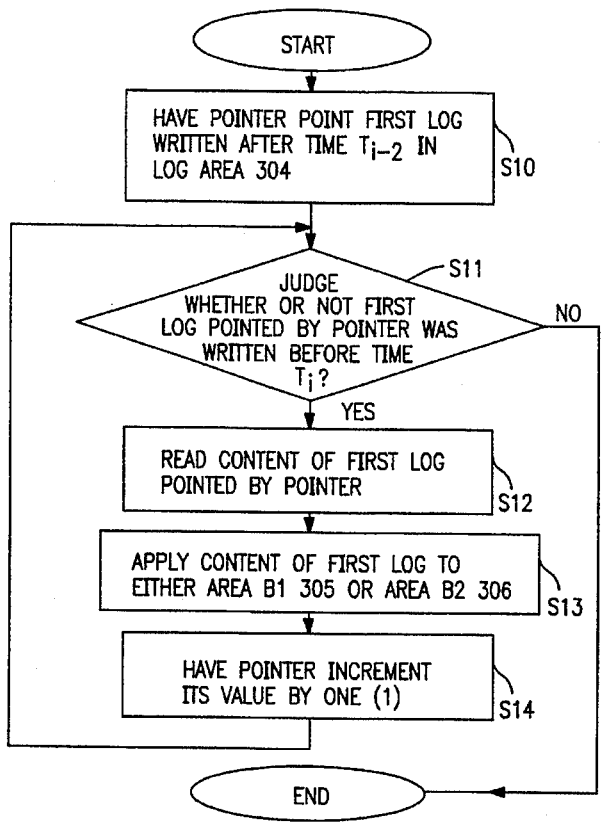
FIG. 5B is a flowchart illustrating operations for updating by a log application area B1 305 and area B2 306 shown in FIG. 3, and illustrating in detail steps S4-1 and S5-1 shown in FIG. 5A.

FIGS. 5A and 5B are flowcharts showing the operations of this invention.

More specifically, FIG. 5A is a flowchart showing overall operations of this invention.

S1: It is confirmed that the time has reached $T_i$. Continue to step S2.

S2: The value of i is divided by two [2] for obtaining a residue X. Continue to step S3.

S3: A judgment is made whether the residue X is one [1] or zero [0]. Continue to steps S4-1 and S4-2, if the residue X is one [1]. Continue to steps S5-1 and S5-2, if the residue X is zero [0].

S4-1: The delayed updating part 307 updates with a delay area B2 306 by applying logs from $T_{i-2}$ to $T_i$. Continue to step S6.

S4-2: Concurrently with S4-1, the retrieval job processing part 308 retrieves data in area B1 305. Continue to step S6.

S5-1: The delayed updating part 307 updates with a delay area B1 305 by applying logs from $T_{i-2}$ to $T_i$. Continue to step S6.

S5-2: Concurrently with S5-1, the retrieval job processing part 308 retrieves data in area B2 306. Continue to step S6.

S6: After executing the processes of steps S4 and S5, time i is substituted by time i+1. After waiting the step S1, namely, at time $T_i$, the step S1 is executed. As the value of i is incremented by one [1] for a wait, by substituting i+1 into i, revert to step S1 in a loop form.

FIG. 5B is a flowchart illustrating operations for updating by a log application area B1 305 and area B2 306 shown in FIG. 3, and illustrating in detail steps S4-1 and S5-1 shown in FIG. 5A.

A start of step S4-1 or S5-1 invokes step S10.

S10: The delayed updating part 307 has a pointer point a first log written after time $T_{i-2}$ in the log area 304. Continue to step S11.

S11: The delayed updating part 307 judges whether or not the first log pointed by the pointer was written before time $T_i$. Continue to step S12 for an affirmative judgment (YES). End for a negative judgment (NO).

S12: The delayed updating part 307 reads the content of the first log pointed by the pointer. Continue to step S13.

S13: The delayed updating part 307 applies the content of the first log to either area B1 305 (corresponding to step S4-1) or area B2 306 (corresponding to step S5-1) according to the judgment in step S3 shown in FIG. 5A. Continue to step S14.

S14: The delayed updating part 307 has the pointer increment its value by one [1]. Revert in a loop form to step S11.

As described is the above steps, a log written in the log area 304 during the period $T_{i-2}$ to $T_i$ is applied to the B area, thereby updating the B area of the database.

Figure 6:
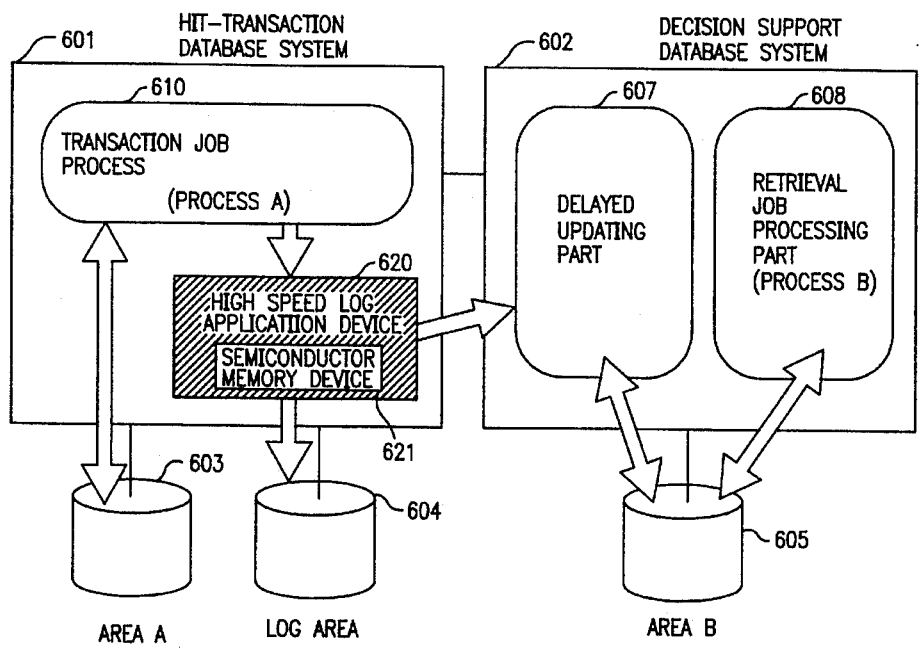
FIG. 6 is a block diagram of a second form of this invention, showing a flow of maintaining a equivalence between data areas.

FIG. 6 is a block diagram of a second form of this invention, showing a flow of maintaining a equivalence between data areas.

As with the first from of this invention shown in FIG. 3, the second form of this invention is premised on a database system including a hit-transaction database system process unit 601 for executing a transaction job (a process A) 610 and a decision support database system process unit 602 having a retrieval job processing part (a process B) 608 for executing a retrieval job for a database created by the hit-transaction database system process unit 601.

A transaction job by the hit-transaction database system process unit 601 creates an area A 603, provided in the hit-transaction database system process unit 601, for storing data to be updated, and thus forming a database.

A log area 604 provided in the hit-transaction database system process unit 601 stores a data content updated or created for area A 603.

A high speed log application device 620 provided in the hit-transaction database system process unit 601 temporarily stores the log generated during a certain time interval.

The high speed log application device 620 comprises a semiconductor memory device 621 such as a cache memory and saves a generated log in the semiconductor memory device 621. That is, because the semiconductor memory device 621 provides a sufficient storage capacity for the high speed log application device 620, the high speed log application device 620 no longer needs to temporarily save a log in the log area 604 in a secondary storage device before performing a delayed updation of the log. Here, the time interval for temporarily storing a log must be set such that a log does not overflow from the semiconductor memory device 621.

Since a log is used for restoring a normal service when a database system experiences a fault, it must also be stored in the log area 604 in a secondary storage device. Hence, the high speed log application device 620 is used for writing data to the log area 604, as with a write-through cache memory.

This sheds the necessity for reading a log content from the log area 604 in the secondary storage device at every lapse of a predetermined time interval.

An area B 605 provided in the decision support database system process unit 602 stores the data including the same database as in area A 603 in the hit-transaction database system process unit 601.

A delayed updating part 607 in the decision support database system process unit 602 updates data in area B 605 by receiving from the high speed log application device 620 in the hit-transaction database system process unit 601 a log at every lapse of a predetermined time interval.

A retrieval job processing part 608 in the decision support database system process unit 602 executes a decision support database system process (process B) by using data in area B 605.

The operations of the second form of this invention are described below.

Ordinarily, a hit-transaction database system process such as an OLTP (online transaction processing) sequentially updates a database. That is, process A 610 by the hit-transaction database system process unit 601 updates data in area A 603. Accompanying this updation, process A 610 copies the updation log to the semiconductor memory device 621 in the high speed log application device 620. Then, the high speed log application device 620 writes the log in the semiconductor memory device 621 over to the log area 604 in the secondary storage device.

The high speed log application device 620 sets the time interval for storing a log in the semiconductor memory device 621 to a certain value. At every lapse of a certain time interval, the high speed log application device 620 transfers accumulated logs to the delayed updating part 607 in the decision support database system process unit 602, which copies the received log as data in area B 605, thereby updating its database. This makes the database in area A 603 to have a eqivalence with the database in area B 605 after a delay by the certain time interval.

Because the above operations do not require the delayed updating part 607 to read a log from the log area 604 but instead copying a log from the semiconductor memory device 621 suffices, the time necessary for a delayed updation is reduced to less then one-tenth [1/10]. This in turn allows a sufficient time to be allocated to process B by the retrieval job processing part 608. Namely, the delayed updation can be performed within the period in which the retrieval processing is performed. Also, since the log area 604 is made exclusively for a write-in, the rate of a write-in to a log area 604 is faster by more than ten [10] times.

As has already been explained in the description of the first form of this invention, when a system duplexing area B 605 is used, a provision of the high speed log application device 620 sheds the necessity for twice reading a log from the lo area in a delayed updation, thereby eliminating a wait of process A 610 for a write-in to a log area 604.

Explanation of the Concrete Embodiments

Described below will be preferred embodiments of this invention with reference to some of the attached drawings.

Figure 7:
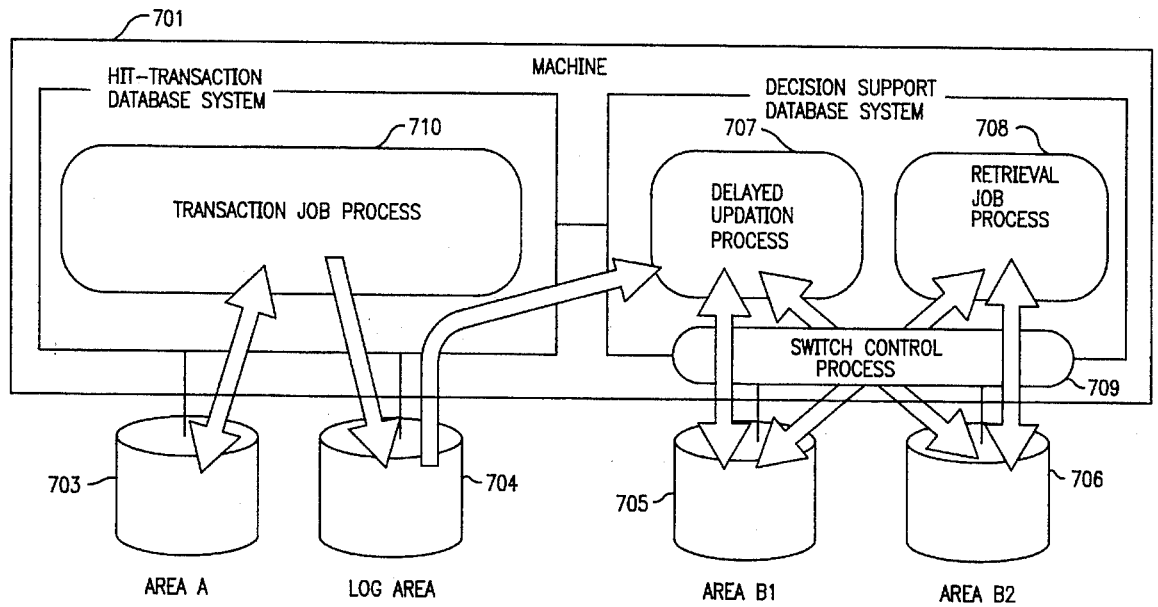
FIG. 7 is a block diagram of a first preferred embodiment of this invention, corresponding to the first form of this invention shown in FIG. 3, and illustrating a configuration of a single machine realizing a database system comprising a hit-transaction database system process unit and a decision support database system process unit.

FIG. 7 is a block diagram of a first preferred embodiment of this invention, corresponding to the first form of this invention shown in FIG. 3, and illustrating a configuration of a single machine realizing a database system comprising a hit-transaction database system process unit and a decision support database system process unit.

The first preferred embodiment is such that a machine 701 provided singularly, e.g. a computer system based on a general purpose computer, configures an entire database system comprising a hit-transaction database system process unit and a decision support database system process unit.

The machine 701 connects with an area A 703 storing a database content to be updated or created by a transaction job process 710, a log area 704 for storing a log being data for updating the database content in area A 703, and duplexed memory areas, namely an area B1 705 and an area B2 706, to become the database for use in the decision support database system process. It is desirable to place memory areas, i.e. area A 703, the log area 704, area B1 705 and area B2 706, respectively in separate disks to prevent an occurrence of an access interference. The log area 704 can be placed e.g. in a nonvolatile memory device.

The machine 701 provided singularly executes as its process the transaction job in the hit-transaction database system process, as well as a delayed updation and a retrieval job in the decision support database system process. That is, as its database system, the machine 701 invokes a transaction job process 710, a delayed updation process 707 and a retrieval job process 708, and the operating system of the machine 701 contemporaneously executes these processes in parallel.

The delayed updation process 707 and the retrieval job process 708 respectively execute a delayed updation and a retrieval job for either area B1 705 or area B2 706, under control by a switch control process 709.

The switch control process 709 alternately switches the connections of area B1 705 and area B2 706 with either the delayed updation process 707 or the retrieval job process 708 in synchronization with a certain time interval, thereby executing the delayed updation process 707 and the retrieval job process 708. (The switch control process 709 executes the process shown in FIG. 5, thereby invoking the delayed updation process 707 and the retrieval job process 708.)

That is, the switch control process 709 connects the delayed updation process 707 with area B1 705 and the retrieval job process 708 with area B2 706 during a certain time interval, while it connects the delayed updation process 707 with area B2 706 and the retrieval job process 708 with area B1 705 during the next time interval.

This enables the log area 704 to store the content of updating the database (area A 703) by the transaction process 710 in the hit-transaction database system process, the delayed udpation process 707 to apply it to area B1 705 and area B2 706 delayed by one [1] time interval, and the decision support database system process to continuously execute the retrieval job process 708 to area B1 705 and area B2 706.

Figure 8:
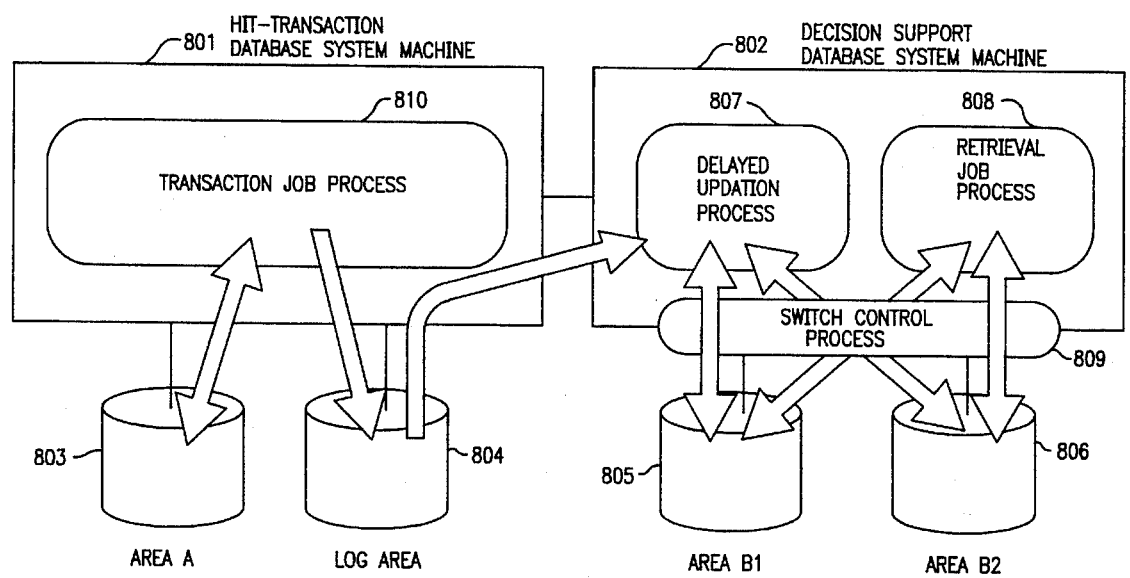
FIG. 8 is a block diagram of a second preferred embodiment of this invention, corresponding also to the first form of this invention shown in FIG. 3, and illustrating a configuration of two [2] machines respectively assigned to a hit-transaction database system process unit and a decision support database system process unit.

FIG. 8 is a block diagram of a second preferred embodiment of this invention, corresponding also to the first form of this invention shown in FIG. 3, and illustrating a configuration of two [2] machines respectively assigned to a hit-transaction database system process unit and a decision support database system process unit.

The second preferred embodiment is such that a hit-transaction database system process machine 801 and a decision support database system process machine 802, e.g. a computer system based on two [2] general purpose computers, jointly configure an entire database system comprising a hit-transaction database system process unit and a decision support database system process unit.

The hit-transaction database system process machine 801 connects with an area A 803 storing a database content to be updated or created by a transaction job process 810, and a log area 804 for storing a log being data for updating the database content in area A 803. The decision support database system process machine 802 connects with, duplexed memory areas, namely an area B1 805 and an area B2 806, and performs a delayed updation and a retrieval job in area B1 805 and area B2 806. Because the hit-transaction database system process machine 801 and the decision support database system process machine 802 exchange a large volume of data, it is desirable to allow for a sufficiently large transfer width.

The decision support database system process machine 802 has a delayed updation process 807 to execute a delayed updation and a retrieval job process 808 to execute a retrieval job.

As with the first preferred embodiment of this invention, the decision support database system process machine 802 invokes a switch control process 809 for having area B1 805 and area B2 806 to the alternately switched for connection with either the delayed updation process 807 and the retrieval job process 808, in synchronization with a certain time interval.

The operations of respective processes are similar to those explained in the description of the first preferred embodiment, except that the delayed updation process 807 can receive a log via a communications path between the hit-transaction database system process machine 801 and the decision support database system process machine 802.

Figure 9:
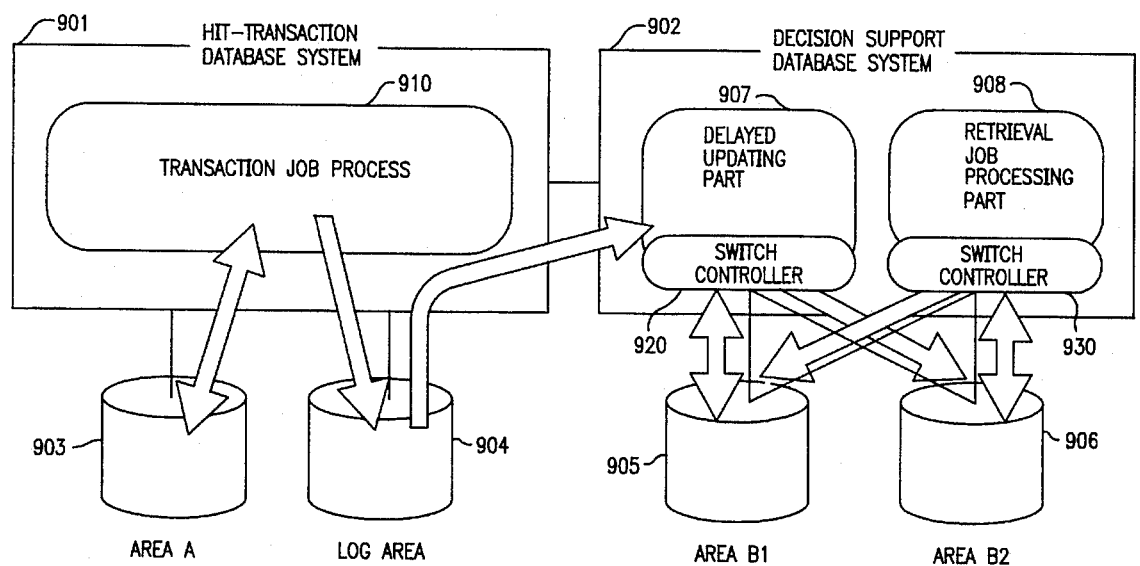
FIG. 9 is a block diagram of a third preferred embodiment of this invention, corresponding also to the first form of this invention shown in FIG. 3, and illustrating a configuration of three [3] machines respectively assigned to a hit-transaction database system process, and a delayed updation process and a retrieval job process in a decision support database system process.

FIG. 9 is a block diagram of a third preferred embodiment of this invention, corresponding also to the first form of this invention shown in FIG. 3, and illustrating a configuration of three [3] machines respectively assigned to a hit-transaction database system process, and a delayed updation process and a retrieval job process in a decision support database system process.

As with the second preferred embodiment of this invention, a transaction job machine 910 in a hit-transaction database system process 901 connects with an area A 903 and a log area 904. However, both a delayed updation machine 907 and a retrieval job machine 908 connect with an area B1 905 and an area B2 906 for allowing an access from those two [2] machines.

Switch controllers 920 and 930 respectively in the delayed updation machine 907 and the retrieval job machine 908 in the decision support database system 902, at every lapse of a certain time interval, control the switching for an alternate connection with an area B1 905 or an area B1 906.

A delayed updation by the delayed updation machine 907 takes out a log from the log area 904 in the transaction job machine 910 at every lapse of the certain time interval, thereby performing a delayed updation in area B1 905 and area B2 906. As with the second embodiment of this invention, in the third preferred embodiment, a data transfer over a communications path allows a log to be exchanged between the transaction job machine 910 and the delayed updation machine 907.

Figure 10:
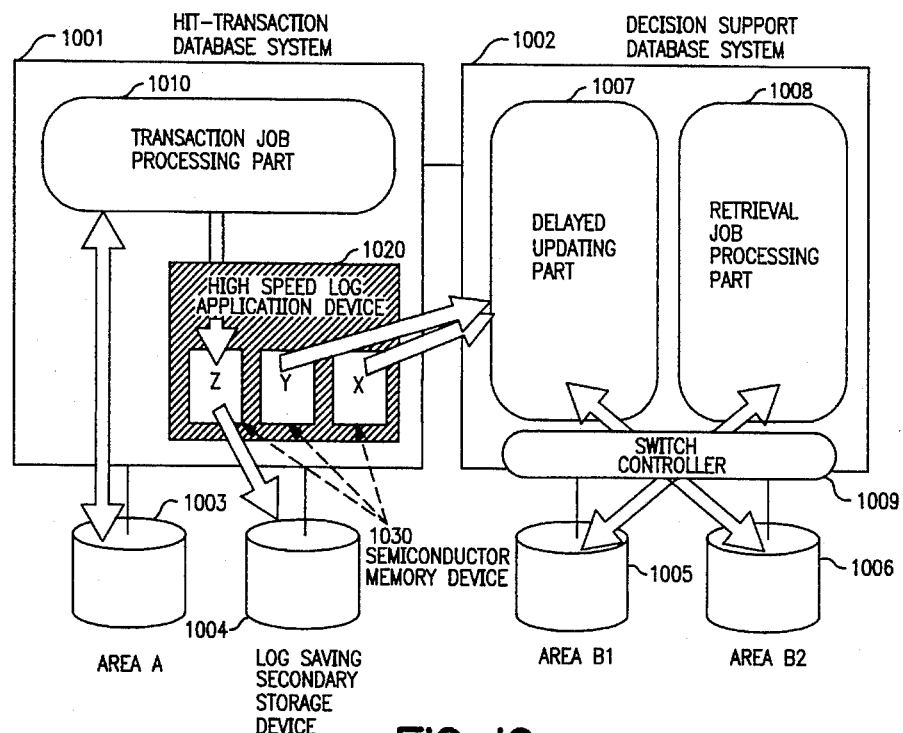
FIG. 10 is a block diagram of a fourth preferred embodiment of this invention, corresponding to the second form of this invention shown in FIG. 6, and illustrating a configuration in which a hit-transaction database system process unit has a high speed log application device and decision support database system process unit has duplex data storage areas.

FIG. 10 is a block diagram of a fourth preferred embodiment of this invention, corresponding to the second form of this invention shown in FIG. 6, and illustrating a configuration in which a hit-transaction database system process unit has a high speed log application device and a decision support database system process unit has duplex data storage areas.

A decision support database system process unit 1002 connects with areas B being duplexed with an area B1 1005 and an area B2 1006. When area B1 1005 undergoes a delayed updation during a certain time interval, area B2 1006 undergoes a retrieval job. When area B1 1005 undergoes a retrieval job during a certain time interval, area B2 1006 undergoes a delayed updation. The decision support database system process unit 1002 has a switch controller 1009 perform the switching.

The hit-transaction database system process unit 1001 comprises a high speed log application device 1020 receiving at anytime an updation log performed by a transaction job processing part 1010. A semiconductor memory device 1030 in the high speed log application device 1020 stores the updation content, which is written also in a log saving secondary storage device 1004. A write-through cache memory realizes the semiconductor memory device 1030.

The log content of the log stored in the semiconductor memory 1030 is provided to the delayed updating part 100 at a certain time interval. Because areas B are duplexed, the semiconductor memory device 1030 has three [3] areas (X, Y and Z) each having a sufficient capacity for storing a log generated during a certain time interval. One [1] of the three [3] areas stores a log generated during a current time interval, which the log saving secondary storage device 1004 saves in a write-through at every lapse of a certain time interval. A delayed updating part 1007 receives log contents (one representing a log generated during the preceding time interval and the other representing a log generated during the time interval before the preceding time interval) stored in the remaining two [2] areas of the semiconductor memory device 1030. The semiconductor memory 1030 necessitates a capacity sufficient for storing logs for three time intervals at the minimum. The area A 1003 and retrieval job processing part 1008 in FIG. 10 correspond to the area A 903 and retrieval job processing part 908 in FIG. 9.

Figure 11:
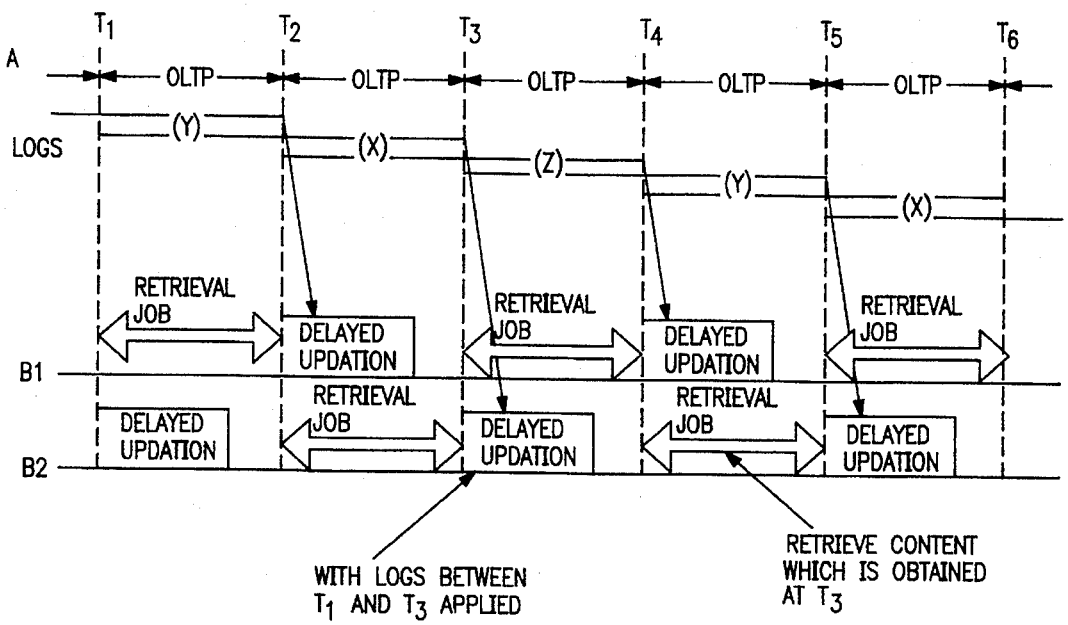
FIG. 11 is a timing chart showing a sequence of delayed updations and retrieval jobs, in relation to logs, executed by the database system shown in FIG. 10.

FIG. 11 is a timing chart showing a sequence of delayed updations and retrieval jobs, in relation to logs, executed by the database system shown in FIG. 10.

A process A (a transaction job process) executes during predetermined time intervals $T_1, T_2 \ldots$, (e.g. between times $T_1$ and $T_2$, between times $T_2$ and $T_3, \ldots$) an OLTP job, which generates a log for updating a database. For instance, the high speed log application device 1020 has three [3] areas Y, X and Z in the semiconductor memory device 1030 store the log generated respectively during the time intervals $T_1$ and $T_2$, during the time intervals $T_2$ and $T_3$, and during the time intervals $T_3$ and $T_4$. Then, the high speed log application device 1020 has the three [3] areas Y, X and Z in the semiconductor memory device 1030 store the log generated respectively during the time intervals $T_4$ and $T_5$, during the time intervals $T_5$ and $T_6$, and during the time intervals $T_6$ and $T_7$. In this manner, a transaction job (OLTP) in process A stores a log by sequentially switching the three [3] areas X, Y and Z in the semiconductor memory device 1030 at every lapse of a certain time interval.

The delayed updating part 1007 in the decision support data base system process unit 1002 receives from the semiconductor memory device 1030 log contents in the two [2] remaining areas not storing a log generated during the current time interval. That is, because area Y stores the current log during the time intervals $T_1$ and $T_2$, the delayed updating part 1007 receives the contents in the two [2] remaining areas X (storing a log generated during the time intervals $T_{i-1}$ and $T_0$ before the preceding time intervals $T_0$ and $T_1$ ($T_{i-1}$ and $T_0$ are not shown)) and Z (storing a log generated during the preceding time interval). Then, the delayed updating part 1007 updates by the current log content data in either area B1 1005 or area B2 1006 in the duplexed area B.

That is, the delayed updating part 1007 during the time interval $T_1$ updates data in area B2 1006 by the received log contents in area X, and the retrieval job processing part 1008 executes a retrieval job by using the data in area B1 1005. Also, during the succeeding time interval $T_2$, the delayed updating part 1007 updates the data in area B1 1005 by the received log content in area Z (storing a log generated time intervals $T_0$ and $T_1$), and the retrieval job processing part 1008 executes a retrieval job by using data in area B2 1006.

As described above, the decision support database system process unit 1002 has the switch controller 1009 switch the duplexed areas B (comprising area B1 1005 and area B2 1006) engaged by the delayed updating part 1007 and the retrieval job processing part 1008 at every elapse of a certain time interval, thereby alternately executing a delayed updation and a retrieval job in area B1 1005 and area B2 1006, which alternately receive either of the logs generated during the two [2] preceding time intervals.

To generalize the above, one of the three [3] areas (Y, Z and X) in the semiconductor memory device 1030 stores a log generated during the time intervals $T_{i-2}$ and $T_{i-1}$, $T_{i-1}$ and $T_i$, and $T_i$ and $T_{i+1}$. At $T_i$, the delayed updating part 1007 receives the content of a log generated during the time intervals $T_{i-2}$ and $T_{i-1}$ (stored in area Y if i=3). At $T_{i+1}$, the delayed updating part 1007 receives the content of a log generated during the time intervals $T_{i-1}$ and $T_i$ (stored in area X if i=3). At $T_{i+2}$, the content of a log generated during the time intervals $T_{i-3}$ and $T_{i-2}$ (stored in area Z if i=3), is maintained and overwrite by the content of a log generated during the time intervals $T_i$ and $T_{i+1}$ (in area Z if i=3). At this time, the delayed updating part 1007 also writes the same log content in the log saving secondary storage device 1004.

Returning to FIG. 10, which illustrates the switching contents at time $T_3$ and $T_4$ shown in FIG. 11, the delayed updating part 1007 receives the log contents in areas Y and X, thereby updating data in area B2 1006, and retrieving data in area B1 1005 at $T_3$. At $T_4$, the content updated at $T_3$ is retrieved in the B2 area 1006.

Figure 12:
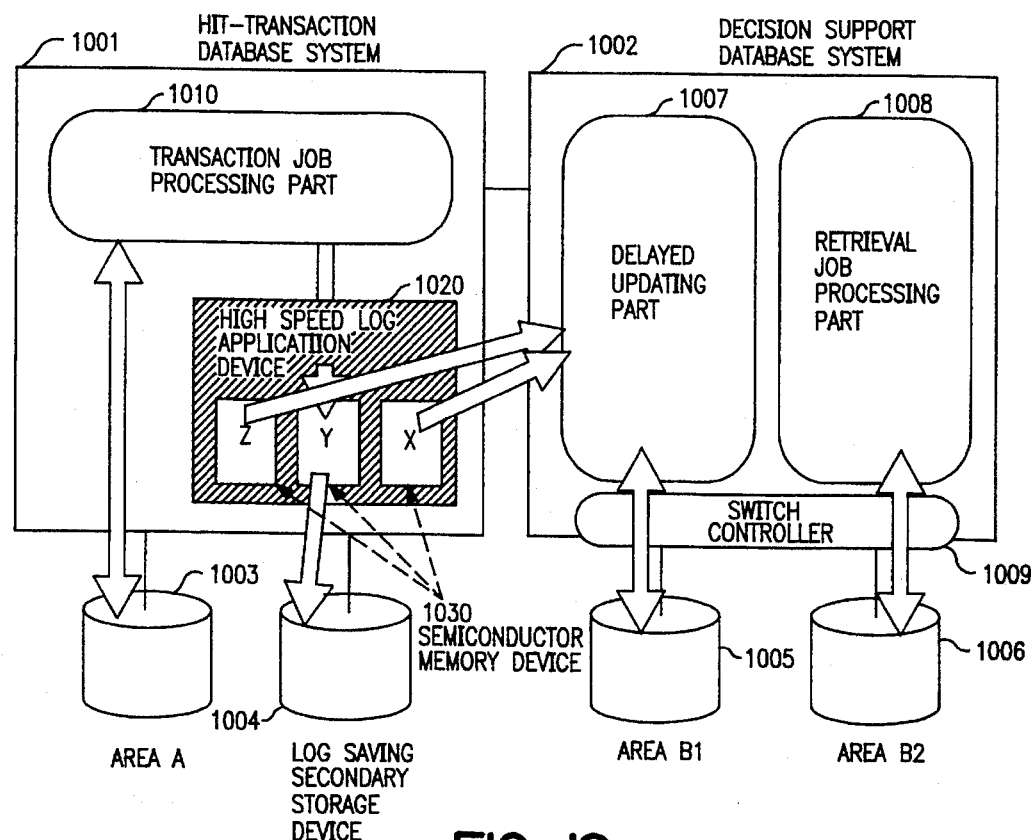
FIG. 12 illustrates the switching content at time $T_4$ shown in FIG. 11.

FIG. 12 illustrates the switching content at time $T_4$ shown in FIG. 11.

At time $T_4$, area Y stores the log generated during the time interval between times $T_4$ and $T_5$, the delayed updating part 1007 concurrently receives the log contents stored in areas Z and X and updates the data in area B1 1005, and the retrieval job processing part 1008 retrieves data in area B2 1006.

Figure 13:
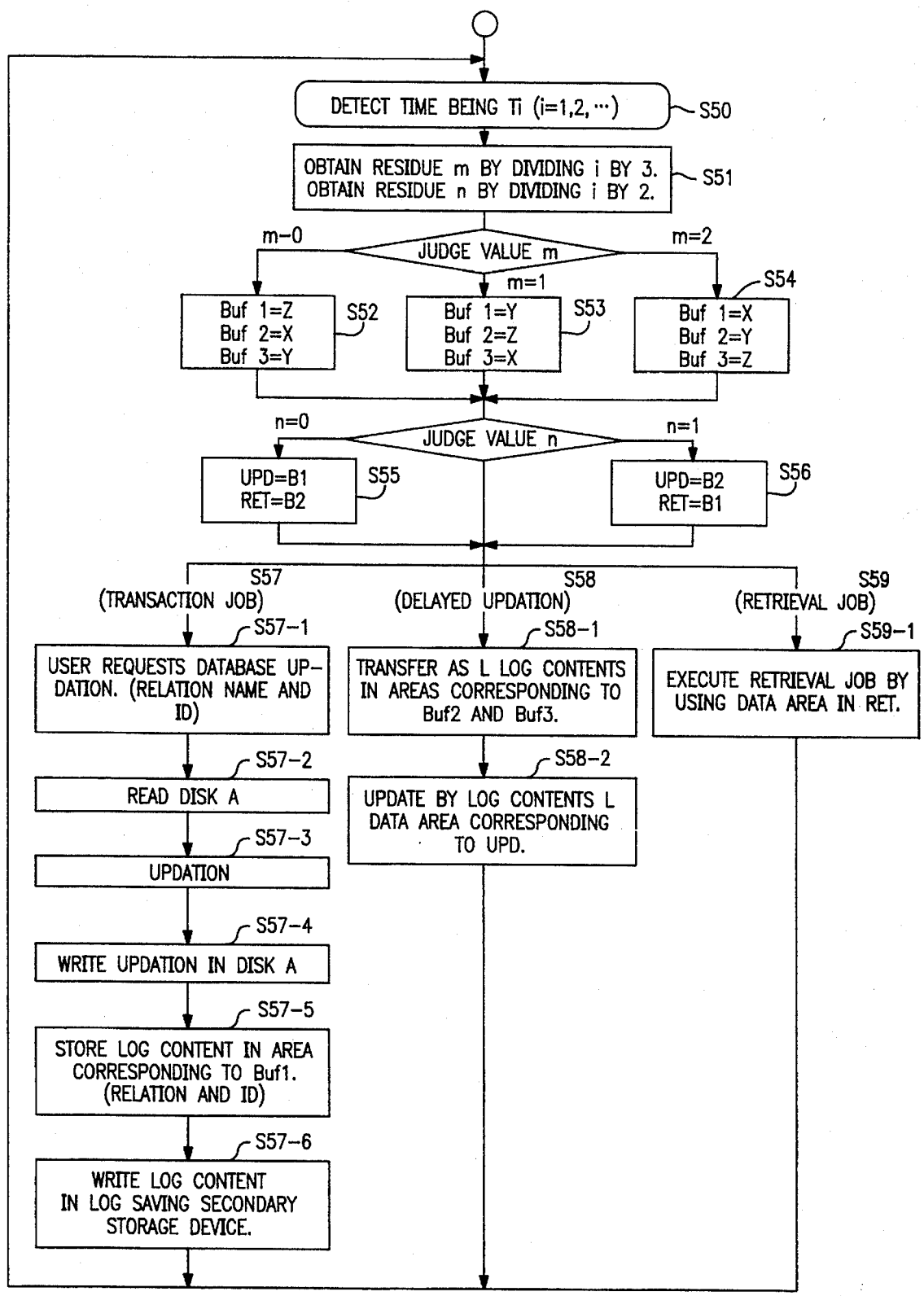
FIG. 13 is a flowchart illustrating the operations of the fourth preferred embodiment shown in FIGS. 10, 11 and 12.

FIG. 13 is a flowchart illustrating the operations of the fourth preferred embodiment shown in FIGS. 10, 11 and 12.

S50 The switch controller 1009 detects a time being $T_i$, (where i=1, 2, . . . ). The switch controller 1009 continues to perform step S50.

S51 The switch controller 1009 obtains a residue m by dividing i by three [3] and a residue n by dividing i by two [2]. The switch controller 1009 continues to perform step S52, S53 or S54 respectively when residue m is zero [0], one [1] or two [2].

The area of the semiconductor memory 1030 in which the content of the log time $T_i$ to $T_{i+1}$ is to be stored is selected from the three areas of the semiconductor memory in the high speed log application device 1020 based on the value of m (S52 to S54).

S52 The switch controller 1009 stores a generated log content in area Z, when m=0 corresponding to times $T_3$, $T_6$, $T_9$, and sets the log storage area identifiers Buf1, Buf2 and Buf3 respectively to Z, X and Y. The switch controller 1009 continues to perform step S55 if n=0 or to step S56 ifg n=1.

S53 The switch controller 1009 stores a generated log content in area Y, when m=1 corresponding to times $T_1$, $T_4$, $T_7$, and sets the log storage area identifiers Buf1, Buf2 and Buf3 respectively to Y, Z and X. The switch controller 1009 continues to perform step S55 if n=0 to step S56 if n=1.

S54 The switch controller 1009 stores a generated log content in area X, when m=2 corresponding to times $T_2 T_5$, $T_8$, and sets the log storage area identifiers Buf1, Buf2 and Buf3 respectively to X, Y and Z. The switch controller 1009 continues to perform step S55 if n=0 or step S56 if n=1.

The data areas which become a subject of the delayed updating process and that of the retrieval job process, respectively are selected from the duplexed B data areas based on the value of n.

S55: Since step S55 is invoked if n=0 (e.g. at any of the times $T_2$, $T_4$, $T_6$, ...), the delayed updating part 1007 sets are B1 1005 for a delayed updation (UPD=B1) and the retrieval job processing part 1008 sets area B2 1006 for a retrieval job (RET=B2).

S56: Since step S56 is invoked if n=1 (e.g. at any of the times $T_1$, $T_3$, $T_5$, ...), the delayed updating part 1007 sets area B2 1006 for a delayed updation (UPD=B2) and the retrieval job processing part 1008 sets area B1 1005 for a retrieval job (RET=B1).

That is, while steps S52, S53 and S54 each select, of the three [3] areas, a area for storing a log content, steps S55 and S56 select, of the duplexed areas B for storing data, the data area for a delayed updation and the data area for a retrieval job during the time interval between times $T_i$ and $T_{i+1}$. Steps S52 through S56 determine the next step to be invoked from among steps S57 by the transaction job processing part 1010, S58 by the delayed updating part 1007 and S59 by the retrieval job processing part 1008.

S57: The transaction job processing part 1010 in the hit-transaction database system process unit 1001 repeatedly performs substeps S57-1 through S57-6 in sequence for a transaction job, until the switch controller 1009 detects the next time $T_{i+1}$, thus returning to step S50. Step S57 corresponds e.g. to a process for dispensing cash to a customer from a bank's ATM.

S57-1: The transaction job processing part 1010 makes a request for updating a database, by using as updation data a relation name, an ID and an updation content of the database to be updated.

S57-2: The transaction job processing part 1010 reads a part in area A 1003 to be updated by using as retrieval data the relation name and the ID in the updation data.

S57-3: The transaction job processing part 1010 updates the part in area A read in step S57-2.

S57-4: The transaction job processing part 1010 overwrites the part updated in step S57-3 in area A 1003.

S57-5: The transaction job processing part 1010 stores the log content in a first area (corresponding to Buf1) in the semiconductor memory device 1030 in the high speed log application device 1020, for updating duplexed areas B (comprising area B1 1005 and area B2 1006) in the decision support database system process unit 1002, by storing the updated relation name, ID and updation content.

S57-6: The transaction job processing part 1010 "as is" writes in the log saving secondary memory device 1004 the log content of the semiconductor memory device 1030 (being a write-through cache memory) stored in step S57-5.

S58: The delayed updating part 1007 in the decision support database system process unit 1002 repeatedly performs substeps S58-1 and S58-2 in sequence for a delayed updation, until the switch controller 1009 detects the next time $T_{i+1}$, thus returning to step S50.

S58-1: The delayed updating part 1007 transfers to the delayed updating part 1007 as L the log contents (generated during the time intervals between times $T_{i-2}$ and $T_{i-1}$ and between times $T_{i-1\ and\ Ti}$) of second and third areas (corresponding to Buf2 and Buf3), not storing the current log, of the semiconductor memory device 1030 in the high speed log application device 1020 in the hit-transaction database system process unit 1001.

S58-2: The delayed updating part 1007 updates data in the area (either area B1 1005 or area B2 1006) specified as UPD by the log contents L.

S59: The retrieval job processing part 1008 in the decision support database system process unit 1002 repeatedly performs substep S59-1 for a retrieval job, until the switch controller 1009 detects the next time $T_{i+1}$, thus returning to step S50.

S59-1: The retrieval job processing part 1008 retrieves data in the area (either area B1 1005 or area B2 1006) specified as RET by the log contents L.

Based on the steps outlined in the flowchart shown in FIG. 13, the transaction job processing part 1010, the delayed updating part 1007 and the retrieval job processing part 1008 perform their respective operations during the time interval between times $T_i$ and $T_{i+1}$.

Although the fourth embodiment of this invention explained above has the duplexed areas B and three [3] areas in the semiconductor memory device 1030 in the high speed log application device 1020, a decision support database system process unit 1002 can do with a simplex area B as well.

Figure 14:
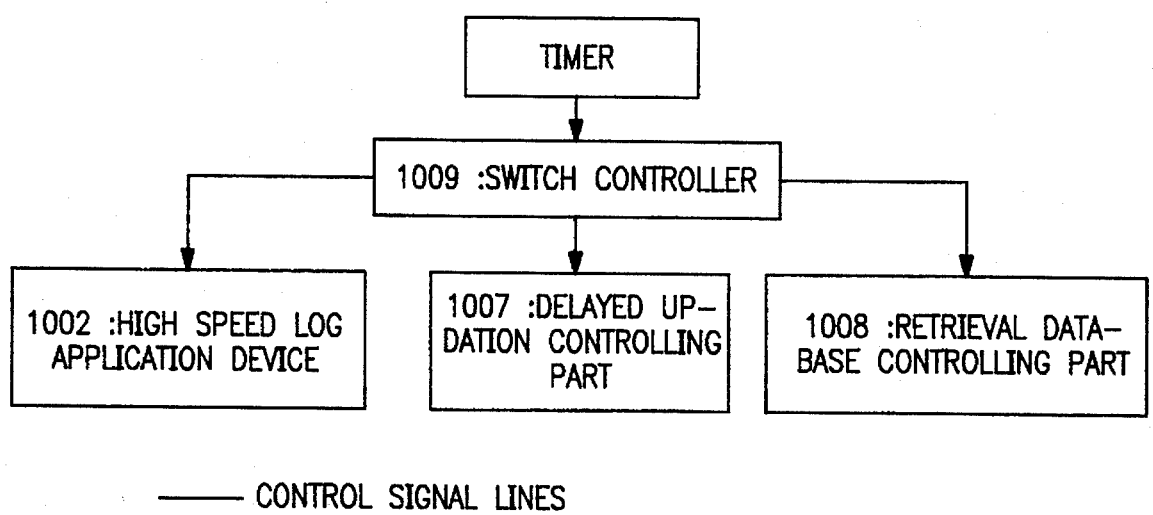
FIG. 14 shows a configuration of the switch controller 1009 shown in FIGS. 10 and 12, and being in charge of steps S50 through S56 shown in FIG. 13.

FIG. 14 shows a configuration of the switch controller 1009 shown in FIGS. 10 and 12, and being in charge of steps S50 through S56 shown in FIG. 13.

On receiving from a timer a time control signal at any of switching times ($T_i$, $T_{i+1}$, ...), the switch controller 1009 performs a switching control by using the time control signal as a trigger, and emits a switch signal to a delayed updation controller (provided in the delayed updation controlling part 1007) and a retrieval job database controller (provided in the retrieval database controlling part 1008), as well as the high speed log application device 1020. On receiving from the switch controller 1009 the switch signal, the delayed updation controller, the retrieval job database controller and the high speed log application device 1020 perform their respective operations related to a switching.

Figure 15:
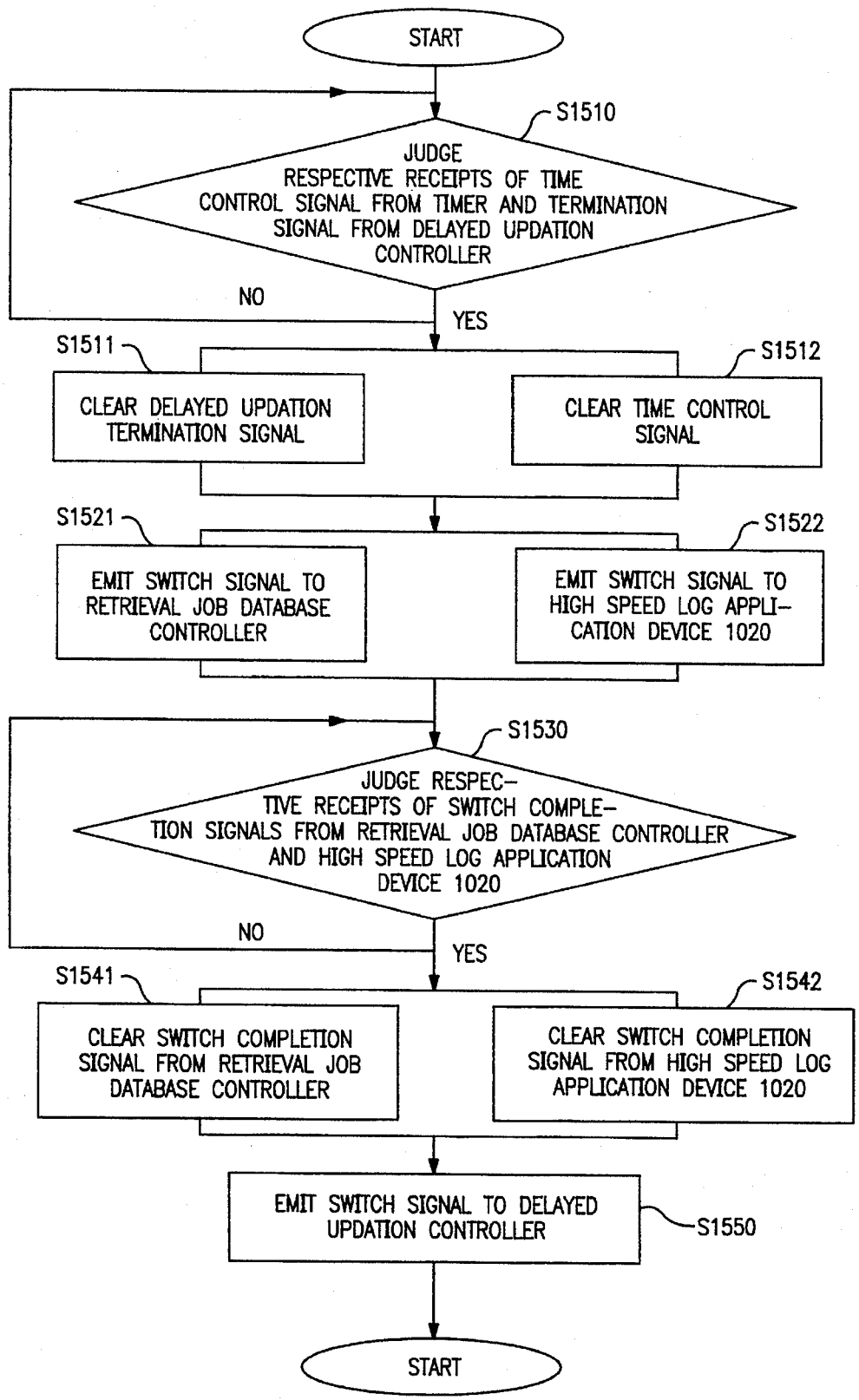
FIG. 15 is a flowchart showing operations of the switch controller 1009 shown in FIGS. 10 and 12.

FIG. 15 is a flowchart showing operations of the switch controller 1009 shown in FIGS. 10 and 12.

A start of operations invokes step S1500.

S1500: The switch controller 1009 judges whether or not the timer (shown in FIG. 14) has emitted a time control signal (for checking whether or not the switching time has reached time $T_i$) and the delayed updation controller (shown in FIG. 14) has emitted a termination signal (for checking whether or not the preceding delayed updation has been completed). Continue to steps S1511 and S1512 for an affirmative judgment (YES). Repeat step S1501 for a negative judgment (NO).

S1511: The switch controller 1009 clears the termination signal from the delayed updation controller. Continue to steps S1521 and S1522.

S1512: The switch controller 1009 clears the time control signal. Continue to steps S1521 and S1522.

S1521: The switch controller 1009 emits the switch signal to the retrieval job database controller (shown in FIG. 14). (Operations of the retrieval job database controller on receipt of the switch signal will be explained later in the description of FIG. 16.) Continue to step S1530.

S1522: The switch controller 1009 emits the switch signal to the high speed log application device 1020. Continue to step S1530. (Operations of the high speed log application device 1020 on receipt of the switch signal will be explained later in the description of FIG. 17.)

S1530: The switch controller 1009 judges whether or not the retrieval job database controller (shown in FIG. 14) has emitted its switch completion signal (for checking whether or not the switching time has reached time $T_i$) and the high speed log application device 1020 (shown in FIGS. 10, 12 and 14) has transmitted its switch completion signal (for checking whether or not the preceding delayed updation has been completed). Continue to steps S1541 and S1542 for an affirmative judgment (YES). Repeat step S1530 for a negative judgment (NO).

S1541: The switch controller 1009 clears the switch completion signal from the retrieval job database controller. Continue to step S1550.

S1542: The switch controller 1009 clears the switch completion signal from the high speed log application device 1020. Continue to step S1550.

S1550: The switch controller 1009 transmitted a switch signal to the delayed updation controller. Revert to step S1550 in a loop form, thereby repeating the operations shown as steps S1500 through S1550. (Operations of the delayed updation controller on receipt of these switch completion signals will be explained later in the description of FIG. 18.)

Figure 16:
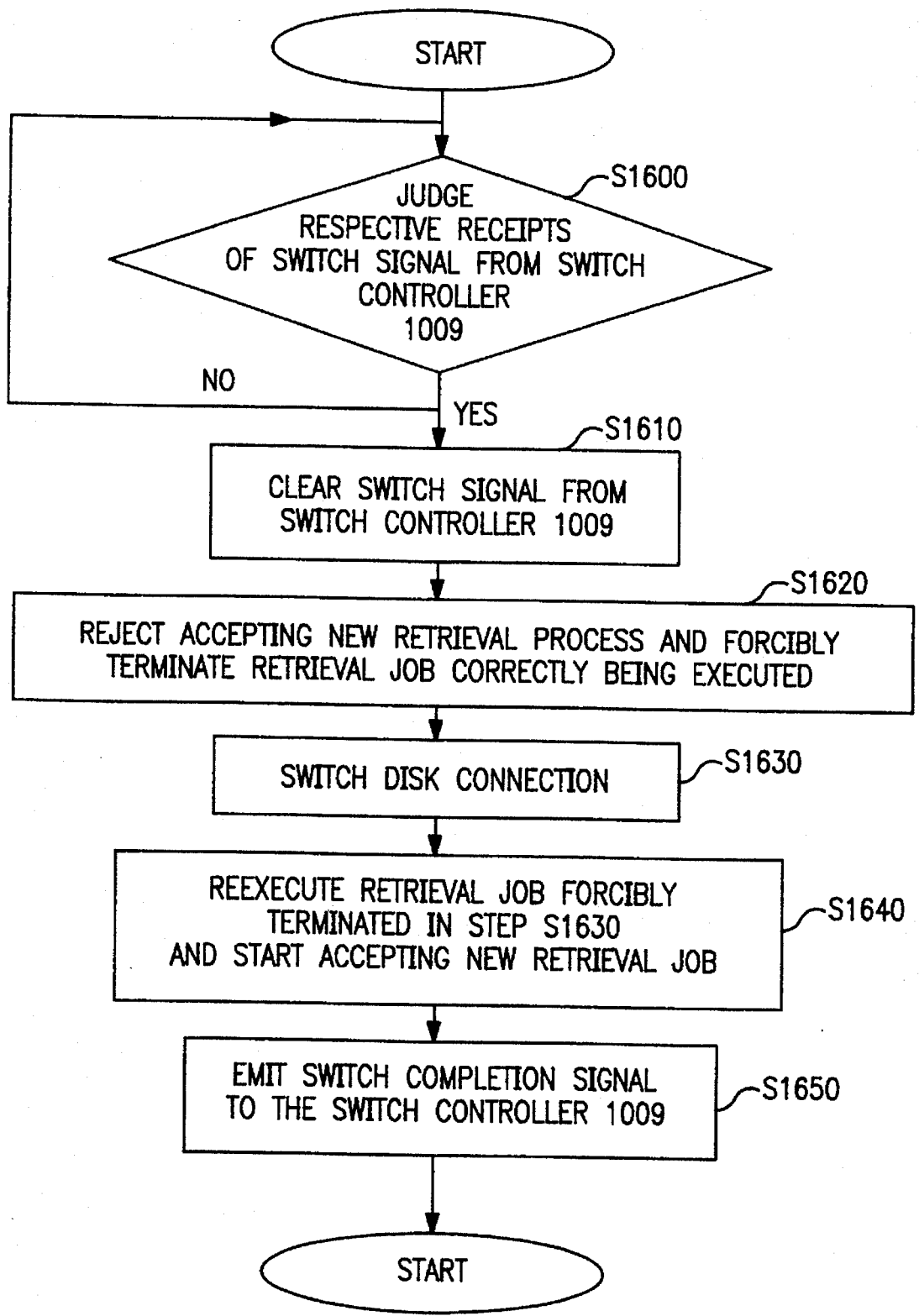
FIG. 16 is a flowchart showing a switching control by the retrieval job database controller shown in FIG. 14.

FIG. 16 is a flowchart showing a switching control by the retrieval job database controller shown in FIG. 14.

A start of operations invokes step S1600.

S1600: The retrieval job database controller judges whether or not it receives a switch signal emitted from the switch controller 1009. Continue to step S1610 for an affirmative judgment (YES). Repeat step S1600 for a negative judgment (NO).

S1610: The retrieval job database controller clears the switch signal from the switch controller 1009. Continue to step S1620.

S1620: The retrieval job database controller rejects accepting a new retrieval process, and forcibly terminates a retrieval job currently being executed. That is, the retrieval job database controller bars the currently connected disk (i.e. either area B1 1005 or area B2 1006) from executing a new retrieval job or continuing a current retrieval job. Continue to step S1630.

S1630: The retrieval job database controller switches the present disk connection to the alternate disk. That is, when the retrieval job processing part 1008 has been connecting with area B1 1005, the retrieval job database controller switches the disk connection to area B2 1006; and when the retrieval job processing part 1008 has been connecting with area B2 1006, the retrieval job database controller switches the disk connection to area B1 1005. Continue to step S1640.

S1640: The retrieval job database controller reexecutes the retrieval job forcibly terminated in step S1630 and starts accepting a new retrieval job. Continue to step S1650.

S1650: The retrieval job database controller transmits a switch completion signal to the switch controller 1009. Revert to step S1600 in a loop form, thereby repeating the switching control shown as steps S1600 through S1650.

Figure 17:
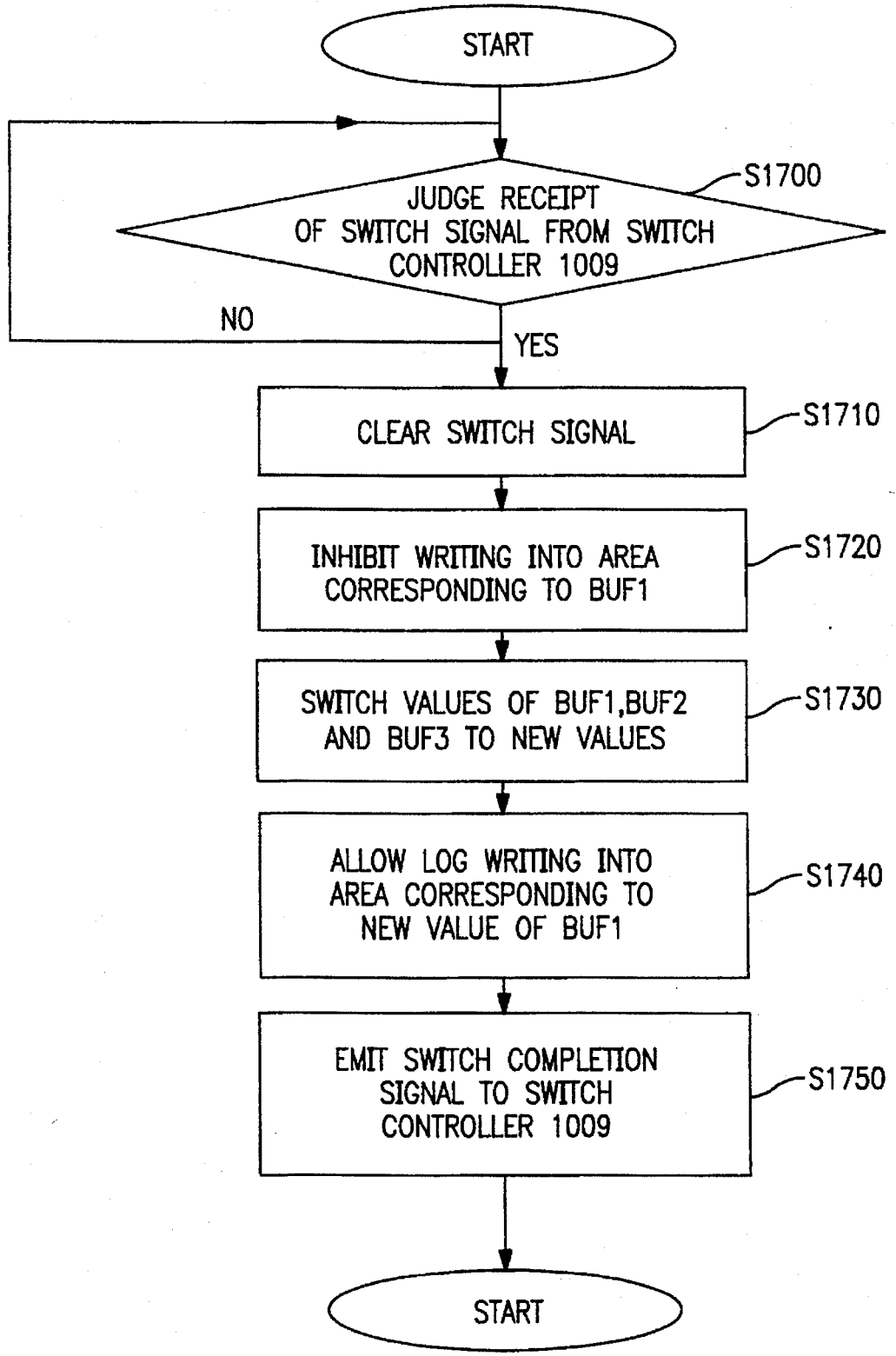
FIG. 17 is a flowchart showing a switching control by the high speed log application device 1020 shown in FIGS. 10 and 12.

FIG. 17 is a flowchart showing a switching control by the high speed log application device 1020 shown in FIGS. 10, 12 and 14.

A start of operations invokes step S1700.

S1700: The high speed log application device 1020 judges whether or not it receives a switch signal transmitted from the switch controller 1009. Continue to step S1710 for an affirmative judgment (YES). Repeat step S1700 for a negative judgment (NO).

S1710: The high speed log application device 1020 clears the switch signal. Continue to step S1720.

S1720: The high speed log application device 1020 inhibits a writing into the disk (X, Y or Z) of the semiconductor memory device 1030 currently saving a log. The value of Buf1 (determined in steps S52, S53 and S54 shown in FIG. 13) identifies the disk (X, Y or Z) currently saving a log. Continue to step S1730.

S1730: The high speed log application device 1020 switches the values of Buf1, Buf2 and Buf3 to new values as determined in steps S52, S53 and S54 shown in FIG. 13. Continue to step S1740.

S1740: The high speed log application device 1020 allows a log writing into the area corresponding to the new value of Buf1. Continue to step S1750.

S1750: The high speed log application device 1020 emits a switch completion signal to the switch controller 1009. Revert to step S1700 in a loop form, thereby repeating the switching control shown as steps S1700 through S1750.

Figure 18:
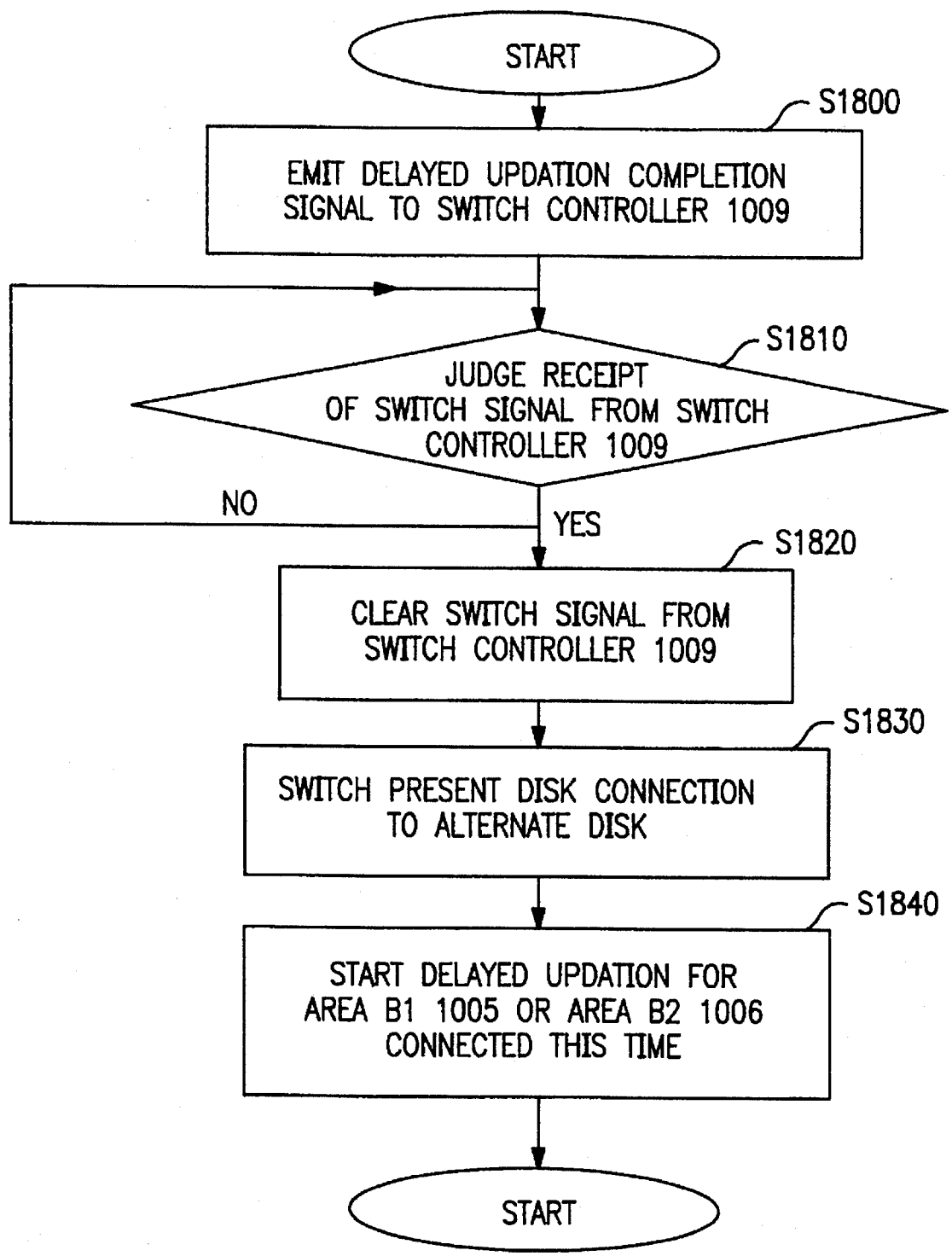
FIG. 18 is a flowchart showing a switching control by the delayed updation controller shown in FIG. 14.

FIG. 18 is a flowchart showing a switching control by the delayed updation controller shown in FIG. 14.

A start of operations invokes step S1800.

S1800: The delayed updation controller emits a delayed updation completion signal to the switch controller 1009.

S1810: The delayed updation controller judges whether or not it has received a switch signal transmitted from the switch controller 1009. Continue to step S1820 for an affirmative judgment (YES). Repeat step S1810 for a negative judgment (NO).

S1820: The delayed updation controller clears the switch signal from the switch controller 1009. Continue to step S1830.

S1830: The delayed updation controller switches the present disk connection to the alternate disk. That is, when the delayed updating part 1007 has been connecting with area B1 1005, the delayed updation controller switches the disk connection to area B2 1006; and when the delayed updating part 1007 has been connecting with area B2 1006, the delayed updation controller switches the disk connection to area B1 1005. Continue to step S1840.

S1840: The delayed updation controller starts a delayed updation for area B1 1005 or area B2 1006 connected this time. Revert to step S1600 in a loop form, thereby repeating the switching control shown as steps S1800 through S1840.

Figure 19:
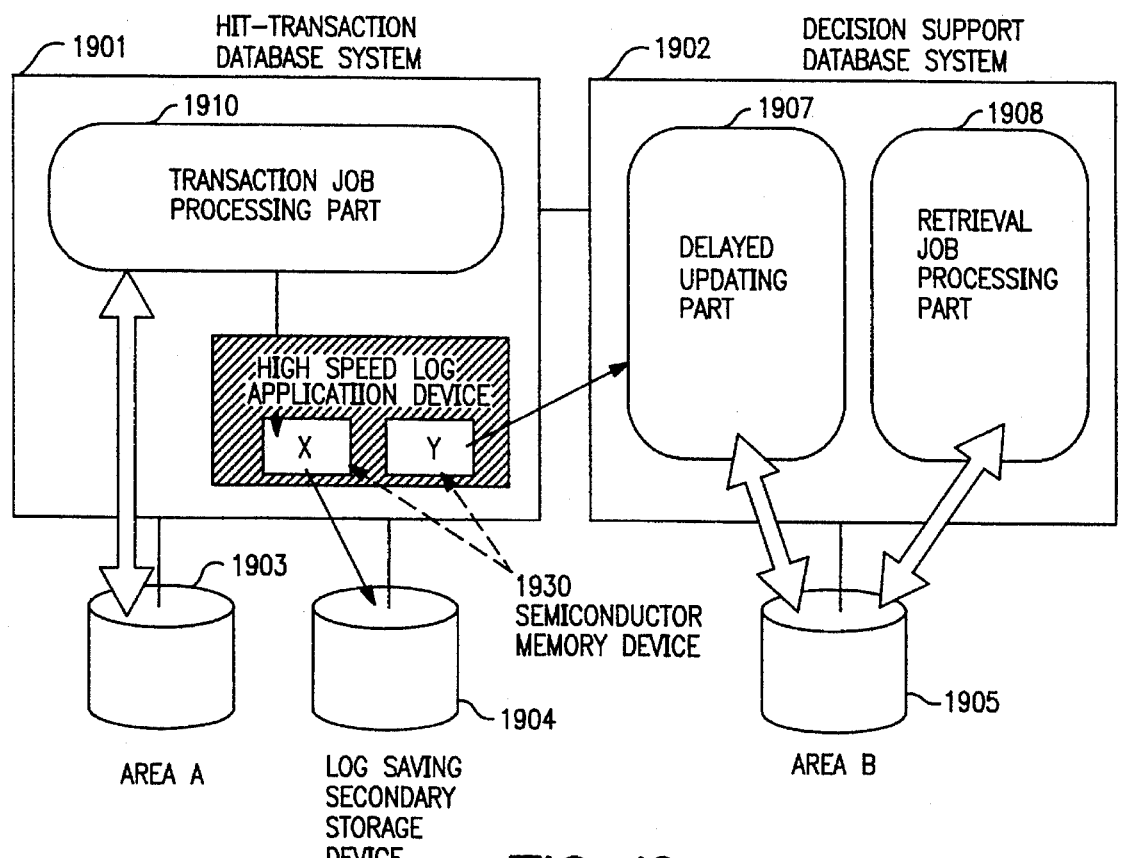
FIG. 19 is a block diagram of a fifth preferred embodiment of this invention, corresponding also to the second form of this invention shown in FIG. 6, and illustrating a configuration in which a hit-transaction database system process unit has a high speed log application device and a decision support database system process unit has a simplex data storage area.

FIG. 19 is a block diagram of a fifth preferred embodiment of this invention, corresponding also to the second form of this invention shown in FIG. 6, and illustrating a configuration in which a hit-transaction database system process unit has a high speed log application device and a decision support database system process unit has a simplex data storage area.

A semiconductor memory device 1930 in a high speed log application device 1920 in a hit-transaction database system process unit 1901 need only have two [2] areas, X and Y.

A transaction job processing part 1910 is active throughout the time interval between times $T_i$ and $T_{i+1}$, and either disk (assume X for example) in the semiconductor memory device 1930 in the high speed log application device 1920 stores a log content accompanying a database updation.

A delayed updating part 1907 operates in parallel with the transaction job processing part 1910 during the time interval between time $T_i$ and $T_{i+1}$. That is, during the time interval between time $T_i$ and $T_{i+1}$, the delayed updating part 1907 in the decision support database system process unit 1902 receives the log content in the other area of the semiconductor memory 1930, (which is area Y in this case and does not perform a storing operation during the time intervals $T_i$ to $T_{i+1}$,) generated during the preceding time interval between times $T_{i-1}$ and $T_i$, and updates an area B 1905 according to the log content.

Because the delayed updating part 1907 needs to complete a delayed updation within a time interval between times $T_i$ and $T_{i+1}$, so that the decision support database system process unit 1902 can allocate the remaining time interval to the retrieval job processing part 1908, the time interval between times $T_i$ and $T_{i+1}$ must be sufficiently long to allow the delayed updating part 1907 to complete a delayed updation. After the delayed updating part 1907 completes a delayed updation and before time $T_{i+1}$, the retrieval job processing part 1908 retrieves data in area B 1905 already updated with a delay by the delayed updating part 1907. The time necessary for the retrieval can be sufficiently longer than the time necessary for the updation with regard to a certain time interval.

What is claimed is:

1. A database system including a transaction database system processing device for executing a transaction database process and a decision support database system processing device for executing a decision support process, comprising:

transaction database storage means, provided with said transaction database system processing device, for retaining a transaction database created and updated by the transaction database process;

a first and second database storage means, each provided with said decision support database system processing device, each for retaining a first and a second decision database, respectively, for use in said decision support process;

delayed updating means, provided with said decision support database system processing device, for alternately supplying, during consecutive time intervals starting at a first time interval, continuing through a second time interval and a third time interval and ending at a fourth time interval, each said time interval being a predetermined time interval, logs created at said first time interval and said second time interval to said first database storage means at said third time interval, and logs created at said second time interval and said third time interval to said second database storage means at said fourth time interval; and retrieving means, provided with said decision support database system processing device, for alternately executing a retrieving process, in synchronism with said predetermined time intervals, for said second decision database stored in said second database storage means when said delayed updating means supplies said logs to said first database storage means and for said first decision database stored in said first database storage means when said delayed updating means supplies said logs to said second database storage means.

2. The database system according to claim 1, wherein:
   said decision support database system processing device and said transaction database system processing device are included in a single computer.

3. The database system according to claim 1, wherein:
   said decision support database system processing device is included in a first computer and said transaction database system processing device is included in a second computer separate from said first computer.

4. The database system according to claim 1, wherein:
   three separate computers respectively include said delayed updating means and said retrieving means in said decision support database system processing device and said transaction database system processing device.

5. The database system according to claim 1, wherein said transaction database, said first decision database and said second decision database represent the same database.

6. A database system according to claim 1, further comprising:
   switching means for alternatively executing a switching operation at each of said predetermined time interval to connect said first database storage means to said delayed updating means and simultaneously to connect said second database storage means to said retrieving means, and alternatively to connect said first database storage means to said retrieving means and simultaneously to connect said second database storage means to said delayed updating means.

7. The database system according to claim 6, wherein:
   said decision support database system processing device and said transaction database system processing device are included in a single computer.

8. The database system according to claim 6, wherein:
   said decision support database system processing device is included in a first computer and said transaction database system processing device is included in a second computer separate from said first computer.

9. The database system according to claim 6, wherein:
   three separate computers respectively include said delayed updating means and said retrieving means in said decision support database system processing device and said transaction database system processing device.

10. A database system including a transaction database system processing device for executing a transaction database process and a decision support database processing system device for executing a decision support process, comprising:

transaction database storage means, provided with said transaction database system processing device, for retaining a transaction database created or updated through the transaction database process;

log dedicated secondary storage means, provided with said transaction database system processing device, for storing a log created based on said transaction database;

high-speed log application means, provided with said transaction database system processing device, for temporarily storing and supplying logs created based on said transaction database to said log dedicated secondary storage means;

a first and a second database storage means, each provided with said decision support database system processing device, each for retaining a first and a second decision database, respectively, for use in said decision support process;

delayed updating means, provided with said decision support database system processing device, for alternately supplying, during consecutive time intervals starting at a first time interval, continuing through a second time interval and a third time interval and ending at a fourth time interval, each said time interval being a predetermined time interval, logs created at said first time interval and said second time interval based on said transaction database of said transaction database storage means to said first database storage means from said high-speed log application means at said third time interval, and logs created at said second time interval and said third time interval based on said transaction database to said second database storage means from said high-speed log application means at said fourth time interval; and retrieving means, provided with said decision support database system processing device, for alternately executing a retrieval process, in synchronism with said predetermined time intervals, for said second decision database stored in said second database storage means when said delayed updating means supplies said logs to said first database storage means and for said first decision database stored in said first database storage means when said delayed updating means supplies said logs to said second database storage means.

11. The database system according to claim 10, wherein said decision support database system processing device comprises switch controlling means for controlling by switching each of said first and second decision databases in said first and second database storage means, respectively, to be accessed by either said delayed updating means or said retrieving means; and said delayed updating means updates either one of said first and second decision databases in said first and second database storage means, respectively, using said log supplied from said high speed log application means, and concurrently, said retrieving means retrieves the other one of said first and second decision databases in said first and second database storing means, respectively.

12. The database system according to claim 10, wherein said high speed log application means comprises three areas switched at every lapse of said predetermined time interval, one of said three areas for contemporaneously saving a current said log being stored in said log dedicated secondary storage means, the other two of said three areas for supplying two preceding said logs to said delayed updating means.

13. The database system according to claim 10, wherein said transaction database, said first decision database and said second decision database represent the same database.

14. The database system according to claim 12, wherein said decision support database system processing device comprises a switch controlling means for controlling by switching each of said first and second decision databases in said first and second database storage means, respectively, to be accessed by either said delayed updating means or said retrieving means; and said delayed updating means updates either one of said first and second decision databases in said first and second database storage means, respectively, using said log supplied from said high speed log application means, and concurrently, said retrieving means retrieves the other one of said first and second decision databases in said first and second database storage means, respectively.

* * * * *

UNITED STATES PATENT AND TRADEMARK OFFICE
CERTIFICATE OF CORRECTION

PATENT NO. : 5,592,660
DATED : January 7, 1997
INVENTOR(S) : Haruo YOKOTA, et al.

It is certified that error appears in the above-indentified patent and that said Letters Patent is hereby corrected as shown below:

TITLE PAGE [30] FOREIGN APPLICATION PRIORITY DATA

"Mar. 4, 1991 [JP] Japan............4-046893" should be --Mar. 4, 1992 [JP] Japan............4-046893--.

TITLE PAGE [56] REFERENCES CITED

"4,657,819 3/1987 Stiffler et al..........395/425" should be --4,654,819 3/1987 Stiffler et al..........395/425--.

Column 5

Line 9, "Unerlying" should be --Underlying--.

Column 14

Line 20, "$T_{i-1}$ and $T_i$)" should be --$T_{i-1}$ and $T_i$)--.

Column 17

Line 59, "a first and second" should be --a first and a second--.

Signed and Sealed this

Fifteenth Day of April, 1997

Attest:

BRUCE LEHMAN

*Attesting Officer*   *Commissioner of Patents and Trademarks*